United States Patent
Furukawa et al.

(10) Patent No.: US 7,488,366 B2
(45) Date of Patent: Feb. 10, 2009

(54) CERAMIC POROUS BODY AND METHOD FOR EVALUATING ITS PERMEABILITY

(75) Inventors: Masahiro Furukawa, Nagoya (JP); Nobuyuki Tanahashi, Nagoya (JP); Yuuichirou Tabuchi, State College, PA (US); Shinji Kawasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 291 days.

(21) Appl. No.: 10/565,645

(22) PCT Filed: Jul. 23, 2004

(86) PCT No.: PCT/JP2004/010473
§ 371 (c)(1), (2), (4) Date: Sep. 22, 2006

(87) PCT Pub. No.: WO2005/009922
PCT Pub. Date: Mar. 2, 2005

(65) Prior Publication Data
US 2007/0033912 A1 Feb. 15, 2007

(30) Foreign Application Priority Data
Jul. 25, 2003 (JP) .............................. 2003-201923

(51) Int. Cl.
*B01D 39/20* (2006.01)
*C04B 38/00* (2006.01)
(52) U.S. Cl. .......................................... 55/523; 501/80
(58) Field of Classification Search .................... 55/523
See application file for complete search history.

(56) References Cited

U.S. PATENT DOCUMENTS

| 4,632,683 | A  | * | 12/1986 | Fukutani et al. ................ 55/523 |
| 6,541,407 | B2 | * | 4/2003  | Merkel et al. ................ 501/119 |
| 6,620,751 | B1 | * | 9/2003  | Ogunwumi ................. 501/134 |
| 6,716,512 | B2 | * | 4/2004  | Yamamoto et al. .......... 428/116 |
| 6,726,977 | B2 | * | 4/2004  | Kumazawa et al. .......... 428/116 |
| 6,764,742 | B2 | * | 7/2004  | Ichikawa et al. ............. 428/116 |
| 6,773,481 | B2 | * | 8/2004  | Noguchi et al. ................ 55/523 |
| 6,815,038 | B2 | * | 11/2004 | Morimoto et al. ........... 428/116 |

(Continued)

FOREIGN PATENT DOCUMENTS

JP 6-182228 7/1994

(Continued)

*Primary Examiner*—Frank M Lawrence
*Assistant Examiner*—Robert A Clemente
(74) *Attorney, Agent, or Firm*—Burr & Brown

(57) ABSTRACT

A ceramic porous body is provided, including a plurality of pores formed in a ceramic substrate at a specified porosity. A pore part is discriminated from a non-pore part by binarizing a cross-sectional plane image of the substrate by image analysis. When a center line passing the central part of the pore part is drawn, the porosity ($\epsilon$ (%)), a mean width ($D_P$ (μm)) of the pore part represented by a mean value of a distance, between outlines specifying the pore part, perpendicular to the center line, a mean length ($L$ (μm)) of the pore part represented by a mean value of a length of the center line between adjacent branch points and a length of the center line between an end of the center line and the branch point, and a mean pore size ($D_H$ (μm)) satisfy a specified relationship.

11 Claims, 2 Drawing Sheets

U.S. PATENT DOCUMENTS

| | | | |
|---|---|---|---|
| 6,818,580 B2 * | 11/2004 | Kumazawa et al. | 501/119 |
| 6,849,181 B2 * | 2/2005 | Ogunwumi et al. | 210/510.1 |
| 6,864,198 B2 * | 3/2005 | Merkel | 501/80 |
| 6,984,253 B2 * | 1/2006 | Ichikawa et al. | 55/484 |
| 7,138,002 B2 * | 11/2006 | Hamanaka et al. | 55/523 |
| 7,141,087 B2 * | 11/2006 | Noguchi et al. | 55/523 |
| 7,141,089 B2 * | 11/2006 | Beall et al. | 55/523 |
| 7,179,316 B2 * | 2/2007 | Merkel et al. | 55/523 |
| 7,288,131 B2 * | 10/2007 | Noguchi et al. | 55/523 |
| 7,294,164 B2 * | 11/2007 | Merkel | 55/523 |
| 7,306,771 B2 * | 12/2007 | Okawara | 422/177 |

FOREIGN PATENT DOCUMENTS

| | | |
|---|---|---|
| JP | 06/256069 | 9/1994 |
| JP | 2001-072478 | 3/2001 |
| JP | 2001-240480 | 9/2001 |

* cited by examiner

CERAMIC POROUS BODY AND METHOD FOR EVALUATING ITS PERMEABILITY

CLAIM OF PRIORITY

This application claims priority under 35 USC 371 to International Application No. PCT/JP2004/010473, filed on Jul. 23, 2004, which claims priority to Japanese Patent Application No. 2003-201923, filed on Jul. 25, 2003, the entire contents of which are hereby incorporated by reference.

TECHNICAL FIELD

The present invention relates to a ceramic porous body, more particularly to a ceramic porous body for use as a member constituting a filter such as a DPF, which has a high porosity with retaining a sufficient strength, a high capturing efficiency and a high permeability as well, and a method for evaluating its permeability.

BACKGROUND ART

A porous honeycomb structure is widely used as a filter (diesel particulate filter (DPF)) for capturing and removing particulate substances included in a dust-containing fluid such as a diesel engine exhaust gas, or a catalyst carrier for carrying a catalyst component which purifies toxic substances in an exhaust gas. The structure is constituted of cell partition walls (ribs) forming a composite member of a plurality of adjacent cells, and a honeycomb outer wall which surrounds and holds outermost peripheral cells positioned in an outermost periphery of this cell composite member. A porous material (porous body) made of a ceramic such as fire-resistant silicon carbide (SiC) is used as a member constituting such porous honeycomb structure.

Moreover, as such honeycomb structure, there is disclosed a porous silicon carbide catalyst carrier having a honeycomb structure obtained by: using as a starting material, for example, a silicon carbide powder having a predetermined specific surface area and containing impurities, forming the material into a desired shape; drying the resultant; and firing the dried formed body in a temperature range of 1600 to 2200° C. (see, e.g., Japanese Patent Application Laid-Open No. 6-182228).

In case of the DPF, there are major demands for the improvement of permeability (reduction in pressure losses) which largely influences fuel consumption of a diesel engine provided with the filter, and improvement of a material strength which influences durability of the filter itself.

Heretofore, there has not been proposed yet any distinct theory which has been adopted in an evaluation method for predicting a permeability from characteristics of the porous body. The permeability of the porous body has been predicted and evaluated based on an empirical rule that the permeability of the porous body is proportional to "(porosity)×(mean pore size/2)$^2$," which is the simplest model from the mathematical standpoint. Therefore, heretofore, attempts have been made to exclusively enhance the porosity (e.g., a value actually measured by Archimedes method) and/or the mean pore size (a value actually measured with a mercury porosimeter) in order to improve a permeation property of the porous body. However, there are problems that the enhancement of the porosity of the porous body involves a strength drop and that enlargement of the pore size causes a drop of the efficiency in capturing the particulate substances (particulates) to be captured. Additionally, there is a substantial restriction to increase the respective values. The afore-mentioned proportional relationship is not always valid, depending on the porous body. Especially in a part of the porous bodies whose porosities and mean pore sizes are enhanced, the permeability cannot attain the value predicted from the proportionality relationship. One should say that a theory and an evaluation method for practical use from an engineering standpoint have been not established.

Specifically, there is a problem that the porous body cannot retain a necessary and sufficient strength during the use as a filter such as the DPF, when the porosity exceeds 80%. The enlargement of the pore size is largely promoted by making, into coarse particles, an organic pore former, or using an organic hollow pore former (e.g., foamed resin or the like) when used for manufacturing the porous body. There is a problem that the particulate capturing efficiency of the resultant porous body largely drops when the pore size exceeds 100 μm. Furthermore, since a large amount of organic pore former is used in manufacturing the porous body whose porosity exceeds 60%, a part of the pore formers is agglomerated. During the firing, ink-bottle-like coarse pores are dotted therefrom. Especially in a case where the mean pore size of such porous body is evaluated with the mercury porosimeter, there is a problem that the value of the size largely rises, and the permeability (pressure loss) is overestimated in the above-described evaluation method. That is, in the above-described conventional evaluation method, a correlation is exhibited in a part of materials constituting the porous body, but is not necessarily exhibited in other materials.

The present invention has been developed in view of such problems in the conventional art, and an object thereof is to provide a ceramic porous body for use as a member constituting a filter such as a DPF, which retains a sufficient strength while having a high porosity and which exhibits a high capturing efficiency and a high permeability, and a method for evaluating the permeability of the body.

SUMMARY OF THE INVENTION

According to the present invention, there is provided a ceramic porous body including a plurality of pores formed in a substrate made of a ceramic at a specified porosity. The substrate has predetermined end faces, and the pores connect through the end faces of the substrate to each other and have branches. When a cross-sectional plane image of the substrate cut along a predetermined plane is binarized by image analysis to distinguish a specified pore part derived from the pores from a specified non-pore part derived from the substrate, and a center line passing a central part of the pore part is drawn on the distinguished image, the porosity ($\epsilon$ (%)), a mean width ($D_P$ (μm)) of the pore part represented by a mean value of a distance, between outlines specifying the pore part and facing each other, perpendicular to the center line, a mean length (L (μm)) of the pore part represented by a mean value of a length of the center line between adjacent branch points among a plurality of specified branch points derived from the center line and a length of the center line between an end of the center line and the branch point adjacent to the end of the center line, and a mean pore size ($D_H$ (μm)) satisfy the relationships expressed by the following equations (1) and (2):

$$200 \leq \epsilon \times (D_P/2)^2/L \tag{1}$$

and $$L \leq D_H/2 \tag{2}$$

In the present invention, the permeability is preferably $5 \times 10^{-12}$ m$^2$ or more, more preferably $1 \times 10^{-11}$ m$^2$ or more.

In the present invention, the ceramic preferably includes at least one type selected from the group consisting of alumina, mullite, cordierite, silicon nitride, and silicon carbide.

In the present invention, a four-point bending strength is preferably 10 MPa or more.

Moreover, according to the present invention, there is provided an evaluation method capable of clarifying superiority/inferiority of a permeability of a ceramic porous body as a member constituting a diesel particulate filter, and a factor for the superiority/inferiority of the permeability. The ceramic porous body includes a plurality of pores formed in a substrate made of a ceramic at a specified porosity. The substrate has predetermined end faces, and pores connect through the end faces of the substrate to each other and have branches. In a case where a cross-sectional plane image of the substrate obtained by cutting the ceramic porous body along a predetermined plane is binarized by image analysis to thereby distinguish a specified pore part derived from the pores from a specified non-pore part derived from the substrate, and a center line passing a central part of the pore part is drawn on the distinguished image, when the porosity ($\epsilon$ (%)), a mean width ($D_P$ (μm)) of the pore part represented by a mean value of a distance, between outlines specifying the pore part and facing each other, perpendicular to the center line, a mean length (L (μm)) of the pore part represented by a mean value of a length of the center line between adjacent branch points among a plurality of specified branch points derived from the center line and a length of the center line between an end of the center line and the branch point adjacent to the end of the center line, and a mean pore size ($D_H$ (μm)) satisfy the relationships expressed by the following equations (1) and (2), it is judged that the ceramic porous body has a superior permeability and a superior pore shape as the member constituting the diesel particulate filter:

$$200 \leq \epsilon \times (D_P/2)^2 / L \quad (1);$$

and $$L \leq D_H/2 \quad (2).$$

DETAILED DESCRIPTION OF THE INVENTION

An embodiment of the present invention will be described hereinafter, but it should be understood that the present invention is not limited to the following embodiment, and design changes, improvements and the like can be applied based on knowledge of a person skilled in the art without departing from the scope of the present invention.

A method for evaluating a permeability of a ceramic porous body of the present invention is an evaluation method capable of clarifying superiority/inferiority of the permeability of the ceramic porous body as a member constituting a diesel particulate filter, and a factor for the superiority/inferiority of the permeability. The ceramic porous body includes a plurality of pores formed in a substrate made of a ceramic at a specified porosity. The substrate has predetermined end faces, and the pores connect to each other through the end faces of the substrate and have branches. A cross-sectional plane image of the substrate obtained by cutting the ceramic porous body along a predetermined plane is binarized by image analysis to thereby distinguish a specified pore part derived from the pores from a specified non-pore part derived from the substrate, and in a case where a center line passing a central part of the pore part is drawn on the distinguished image, when the porosity ($\epsilon$ (%)), a mean width ($D_P$ (μm)) of the pore part represented by a mean value of a distance, between outlines specifying the pore part and facing each other, perpendicular to the center line, a mean length (L (μm)) of the pore part represented by a mean value of a length of the center line between adjacent branch points among a plurality of specified branch points derived from the center line and a length of the center line between an end of the center line and the branch point adjacent to the end of the center line, and a mean pore size ($D_H$ (μm)) satisfy the relationships expressed by the following equations (1) and (2), it is judged that the ceramic porous body has a superior permeability and a superior pore shape as the member constituting the diesel particulate filter.

$$200 \leq \epsilon \times (D_P/2)^2 / L \quad (1); \text{ and}$$

$$L \leq D_H/2 \quad (2).$$

An embodiment of the present invention will be described hereinafter in detail.

When the evaluation method of the present invention is carried out, the ceramic porous body as a sample is first cut to obtain a predetermined cross-sectional plane. In this case, when the cross-sectional plane is formed into a uniform plane, the cross-sectional plane may be appropriately polished. It is to be noted that in the ceramic porous body as the sample (the ceramic porous body of the present invention), a multiplicity of pores connecting the end faces to each other (from one end face to the other end face) and having branches are formed in the substrate made of the ceramic.

Figure 1A:
FIG. 1(a) is a flow diagram showing one embodiment of a method for evaluating a permeability of a ceramic porous body in the present invention.
Figure 1B:
FIG. 1(b) is a flow diagram showing one embodiment of a method for evaluating the permeability of the ceramic porous body in the present invention.
Figure 1C:
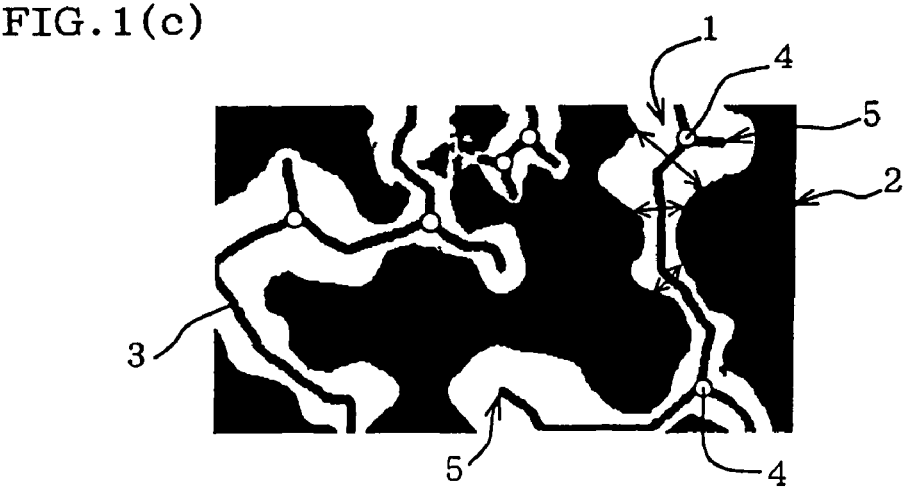
FIG. 1(c) is a flow diagram showing one embodiment of a method for evaluating the permeability of the ceramic porous body in the present invention.

FIGS. 1(a) to 1(c) are flow diagrams showing one embodiment of the method for evaluating the permeability of the ceramic porous body of the present invention. The above-described plane image of the cross-sectional plane is taken into a computer such as a personal computer (PC) by use of image take-in means such as a scanner. The taken plane image is binarized by a technology of predetermined image analysis to distinguish a pore part 1 which is a white portion from a non-pore part 2 which is a black portion as shown in FIG. 1(a) and extract the parts. In this case, the extracted pore part 1 is a specified part derived from the pores of the ceramic porous body, and the non-pore part 2 is a specified part derived from the substrate of the ceramic porous body. After extracting the pore part 1 and the non-pore part 2, as shown in FIG. 1(b), a center line 3 passing the central part is drawn on the image. A predetermined image processing technology is applied to the pore part 1 in the plane image to thereby extract (draw) this center line 3 as a fine line having a width for one pixel.

Next, there are specified four types of parameters: the porosity ($\epsilon$ (%)) of the ceramic porous body as the sample; the pore part mean length (L (μm)); the pore part mean width ($D_P$ (μm)); and the mean pore size ($D_H$ (μm)). The porosity ($\epsilon$ (%)) can be specified by the image analysis, that is, by calculating a ratio of an area of the pore part 1 with respect to that of the whole image, but a value measured by Archimedes method may be used. However, the value of ∈ (%) substituted into the above-described equation (1) in the present invention is a value measured by Archimedes method. The pore part mean length (L (μm)) is a value represented by the mean value of the length of the center line 3 between the adjacent branch points among a plurality of specified branch points 4 derived from the branches of the center line 3, and the length of the center line 3 between an end 5 of the center line 3 and the branch point 4 adjacent to the end 5 of the center line 3 as shown in FIG. 1(c). Furthermore, the pore part mean width ($D_P$ (μm)) is a value represented by the mean value of the distance crossing the center line 3 at right angles between the outlines specifying the pore part 1 and facing each other, and indicates a width of each end arrow portion in FIG. 1(c). Specifically, the value can be calculated by calculating a value twice that of the shortest distance between each pixel of the center line 3 and the outline specifying the pore part 1, and averaging the values of all pixels.

In the present embodiment, in a case where these four types of parameters (∈ (%), $D_P$ (μm), $D_H$ (μm), and L (μm)) satisfy the relationships expressed by the following equations (1) and (2), that is, a value of "∈×$(D_P/2)^2$/L" calculated using ∈ (%), $D_P$ (μm), and L (μm) is 200 or more, and the value of L is ½ or less of the value of $D_H$, it is judged and evaluated that the ceramic porous body as the sample has a superior permeability and a superior pore shape as the member constituting the DPF. As to the ceramic porous body of the present invention, these four types of parameters (∈ (%), $D_P$ (μm), $D_H$ (μm), and L (μm)) satisfy the relationships expressed by the following equations (1) and (2):

$$200 \leq \epsilon \times (D_P/2)^2/L \quad (1);$$

and $$L \leq D_H/2 \quad (2).$$

Among the above-described four types of parameters, the pore part mean width ($D_P$ (μm)) is a number average of all the pixels, having a value twice that of the shortest distance from each pixel of the center line to the outline which is a boundary between the non-pore part and the pore part. Therefore, the width is a parameter represented by the mean value on the basis of the number of pores without excessively evaluating spotted ink-bottle-like coarse pores unlike the value of the mean pore size ($D_H$ (μm)) measured using a conventional mercury porosimeter or the like and obtained as a volume average. That is, the use of the pore part mean width ($D_P$ (μm)) can achieve a high correlation with the actually measured value of the permeability, and the permeability of the ceramic porous body as an object can be evaluated more strictly. It is to be noted that examples of application software for use in the image analysis for carrying out the above-described evaluation method include Image-Pro Plus (trade name) (manufactured by MEDIA CYBERNETICS Co.), but the present invention is not limited to the use of this application software.

Moreover, among the above-described four types of parameters, the pore part mean length (L (μm)) is a parameter concerning a pore shape. In a case where this value is small, it is meant that the ceramic porous body is provided with finer branched pores, even when the value of the mean pore size measured with the mercury porosimeter is equal. That is, the pore part mean length (L (μm)) mentioned in the present invention is a parameter indicating frequency of branching of the pores in the ceramic porous body. Therefore, when this value is small, the ceramic porous body can be evaluated to have more superior pore shape.

Furthermore, the value of "∈×$(D_P/2)^2$/L" has a high correlation with the value of the permeability of the ceramic porous body. Therefore, the ceramic porous body of the present invention satisfying the relationships expressed by the above-described equations (1) and (2) retains a sufficient strength while having the high porosity and exhibits a high capturing efficiency and a high permeability, so that the ceramic porous body is judged to have superior permeability and pore shape as the member constituting the DPF. It is to be noted that from a viewpoint that there be provided the ceramic porous body having more superior permeability as the member constituting the DPF, the value of "∈×$(D_P/2)^2$/L" is preferably 220 or more, more preferably 240 or more. It is to be noted that the value of "∈×$(D_P/2)^2$/L" is preferably theoretically high, but may be substantially 3500 or less from a viewpoint that the strength and capturing efficiency required for the member constituting the DPF be demonstrated.

In the ceramic porous body of the present invention, from a viewpoint that the sufficient permeability be demonstrated as the member constituting the DPF, the permeability is preferably $5 \times 10^{-12}$ $m^2$ or more, more preferably $1 \times 10^{-11}$ $m^2$ or more, especially preferably $1.5 \times 10^{-11}$ $m^2$ or more. It is to be noted that the "permeability" mentioned in the present invention is defined by the Darcy rule, refers to a value (with the proviso that the flow of the fluid in the material is a laminar flow) indicating ease of flow of the fluid per unit area in the filter material, and is represented by the following equation (3). In the present invention, there is not any special restriction on an upper limit of the permeability, the value is preferably theoretically high, but may be $2.0 \times 10^{-10}$ $m^2$ or less from a viewpoint that substantial manufacturability or capturing efficiency be exhibited.

$$P = (V \times W \times S)/L_P \quad (3),$$

(with the proviso that in the above equation (3), P denotes a permeability ($\times 10^{-12}$ $m^2$), V denotes a static viscosity coefficient (mPa.s) of a supply fluid, W denotes a thickness (μm) of a sample (ceramic porous body), S denotes a mean flow rate (m/s) of the supply fluid, and $L_P$ denotes a pressure loss (kPa).

It is to be noted that "mean pore size ($D_H$ (μm))" mentioned in the present invention refers to an actually measured value measured with a mercury porosimeter. In the present invention, there is not any special restriction on a lower limit of a value of ratio L (μm)/$D_H$ (μm), and the limit may be substantially 1/10 or more.

In the ceramic porous body of the present invention, the ceramic constituting the substrate preferably contains at least one selected from the group consisting of alumina, mullite, cordierite, silicon nitride, and silicon carbide. The ceramic porous body whose substrate is constituted of the ceramic containing at least one of them is preferable as the member constituting the DPF.

Moreover, in the ceramic porous body of the present invention, the four-point bending strength is preferably 10 MPa or more because the sufficient strength can be exhibited, more preferably 12 MPa or more, especially preferably 15 MPa or more. It is to be noted that in the present invention, there is not any special restriction on an upper limit of the four-point bending strength, but the limit may be 100 MPa or less from a viewpoint of substantial manufacturability or the like.

Next, the present invention will be described in more detail in accordance with an example of a manufacturing method in a case where silicon carbide is used as an aggregate constituting the substrate of the ceramic porous body, and metal silicon is used as a bonding material. During the manufacturing, first there is prepared a material mixture including particulate silicon carbide as the aggregate and metal silicon as the bonding material. These materials sometimes include a slight amount of impurities such as iron (Fe), aluminum (Al), and calcium (Ca). However, the materials may be used as such, or they may be subjected to a chemical treatment such as chemical cleaning and refined for use. There are added, to the prepared material mixture, a pore former supposed to be effective in connecting communication holes having certain degrees of uniform pore widths in multiple directions without forming the pore part to be coarse like the ink bottle after fired even when agglomerated, and a sintering auxiliary agent (e.g., a compound containing: inorganic micro-balloons which are not eliminated even when fired (which do not form any ink-bottle-like coarse pores even when agglomerated); and an alkali earth metal which melts the balloons during the firing to form the communication holes). Thereafter, if necessary, a forming auxiliary agent such as an organic binder is added, mixed, and kneaded to obtain a clay to be formed.

The inorganic micro-balloons exhibit a function of the pore former when added to the material mixture, and do not disappear even when fired. Therefore, even in a case where a part of the balloons agglomerates, although the permeability is not improved, any ink-bottle-like coarse pore is not formed that uselessly enlarges the porosity or the pore size to lower the strength and the capturing efficiency of the porous body. In addition, silicon carbide particles and/or metal silicon powder may be formed into hollow balloons (SD granules) with a spraying drier or the like, and similarly used as the pore former which is not eliminated even when fired. It is to be noted that in this case, all of the pore formers may be constituted of a pore former supposed to be effective in connecting the communication holes having certain degree of uniform pore widths in multiple directions without forming any ink-bottle-like coarse pore part after fired even when agglomerated. The organic pore formers may be combined. The resultant clay is formed into a predetermined shape such as a honeycomb shape, and the resultant article is calcined to remove (degrease) an organic binder in the article. Thereafter, the article can be fired to obtain the ceramic porous body.

It is to be noted that when the inorganic micro-balloons are used, a compound containing an alkali earth metal may be added to the material mixture simultaneously. The compound containing the alkali earth metal refers to a compound containing the alkali earth metal which is at least one selected from the group consisting of magnesium (Mg), calcium (Ca), strontium (Sr), and barium (Ba). Typical examples of the compound include a compound such as strontium carbonate ($SrCO_3$) or calcium acetate ($Ca(CH_3COO)_2$) forming monoxide of at least one alkali earth metal selected from the group consisting of magnesium oxide (MgO), calcium oxide (CaO), strontium oxide (SrO), and barium oxide (BaO), when oxidized or decomposed during the calcining or the firing. When this compound is added, the inorganic micro-balloons melt during the firing to prevent the pore part from being coarse like the ink bottle, and form a high-porosity porous structure in which the communication holes having certain degrees of uniform pore widths are connected in multiple directions. Furthermore, in this case, the molten material forms an oxide phase containing silicon (Si), aluminum (Al), and the alkali earth metal in the surfaces and/or peripheries of silicon carbide particles and/or metal silicon. An appropriate amount of this oxide phase exists in the surface and/or the periphery of silicon carbide and/or metal silicon, and therefore helps necking among the silicon carbide particles. It is possible to obtain a ceramic porous body which has a high porosity but has a high strength.

Moreover, as to a pore former that is effective in connecting the communication holes having the certain degrees of uniform pore widths in multiple directions without forming the pore part to be coarse like the ink bottle after fired even when agglomerated, the size, added amount and the like of the pore former are appropriately adjusted to adjust the porosity and the pore size of the resultant ceramic porous body. It is possible to prepare a preferred porous body as the member constituting the diesel particulate filter. It is to be noted that in a case where the inorganic micro-balloons are used, the temperature at which the inorganic micro-balloons melt and the formed oxide phase change with parameters such as the composition of the inorganic micro-balloons and the type and added amount of the compound containing the alkali earth metal. Therefore, the firing temperature, and the oxide phase of the resultant ceramic porous body can be known beforehand by means of these parameters. Therefore, it is possible to flexibly adjust material design and corresponding manufacturing design depending on use conditions of a targeted DPF or the like.

Moreover, in a case where the inorganic micro-balloons are used, preferably 5 to 30 parts by mass, more preferably 1 to 30 parts by mass of inorganic micro-balloons are added to a total amount of 100 parts by mass of silicon carbide and metal silicon. When the amount is less than five parts by mass, a pore forming effect is not exhibited in some case. When the amount exceeds 30 parts by mass, the amount of the formed oxide phase is excessively large. Therefore, the fired article contracts, and unfavorably the pore forming effect is not exhibited well in some cases. It is to be noted that the organic pore formers can be combined in a case where the porosity is further to be improved.

Furthermore, in a case where the inorganic micro-balloons are used, it is preferable to add a compound containing the alkali earth metal in order to melt the balloons during the firing. The added amount is an amount which is sufficient for melting the inorganic micro-balloons at a temperature to fire the ceramic porous body and with which the fired article does not contract owing to the excessively low viscosity of the molten material. Specifically, for example, in a case where E-SPHERES SL-75 (manufactured by ENVIROSPHERES Co.) is selected as the inorganic micro-balloons, it is preferable to add 10 to 100 parts by mass of the compound containing the alkali earth metal and including the alkali earth metal contained beforehand in the inorganic micro-balloons in terms of monoxide of the alkali earth metal with respect to 100 parts by mass of the added inorganic micro-balloons. Especially, from a viewpoint that there be precipitated an oxide phase (feldspar) effective for improvements of thermal shock resistance, oxidation resistance, and strength, such as cordierite, anorthite, strontium feldspar ($SrAl_2Si_2O_8$), or celsian ($BaAl_2Si_2O_8$), it is further preferable to add, to an added amount of 100 parts by mass of the inorganic micro-balloons, 10 to 25 parts by mass of the compound containing the alkali earth metal in terms of magnesium oxide (MgO) in a case where the alkali earth metal included in the compound containing the alkali earth metal is magnesium (Mg); 14 to 35 parts by mass of the compound in terms of calcium oxide (CaO) in a case where the metal is calcium (Ca); 26 to 64 parts by mass of the compound in terms of strontium oxide (SrO) in a case where the metal is strontium (Sr); and 38 to 95 parts by mass of the compound in terms of barium oxide (BaO) in a case where the metal is barium (Ba), respectively. It is to be noted that when the added amount of the compound containing the alkali earth metal is less than 10 parts by mass in terms of monoxide of the alkali earth metal, it is sometimes difficult to melt the inorganic micro-balloons. When the amount exceeds 100 parts by mass, surplus remains, the fired article contracts, and unfavorably the pore forming effect is not exhibited in some case.

It is to be noted that the compound containing the alkali earth metal may contain only one type of alkali earth metal, or a plurality of types of alkali earth metals. When the compound containing the alkali earth metal is added, only one type of compound containing the alkali earth metal may be added, or a plurality of types of compounds may be added. When the plurality of types of compounds is added, added amounts may be varied, or equally divided. The compound containing the alkali earth metal and the inorganic micro-balloons are included in the clay and fired. Accordingly, it is possible to form a high-porosity porous structure in which the inorganic micro-balloons are molten during the firing, the pore part is not formed to be coarse like the ink bottle, and the communication holes having the certain degrees of uniform pore widths are connected in multiple directions.

As described above, in a case where the pore former is used which is supposed to be effective in connecting the communication holes having the certain degrees of uniform pore widths in multiple directions without forming the pore part to be coarse like the ink bottle after fired even when agglomerated, even when the agglomeration of the pore former occurs, which raises a problem in the use of the organic pore former, there is a remarkably low possibility that the coarse pores are generated. Therefore, there is a low possibility that the fluid leaks, and particulates and the like in a dust-containing fluid can be captured with good efficiency. Since the communication holes having the certain degrees of uniform pore widths are connected to multiple directions, there can be provided the ceramic porous body having more superior permeating performance (permeability) even at the equal porosity and mean pore size.

In a case where the inorganic micro-balloons are used, since the molten oxide phase fills in a small fine pore part, the necking is helped among the particulate silicon carbide particles, and the strength can be improved. Furthermore, the precipitation of cordierite, anorthite, strontium feldspar ($SrAl_2Si_2O_8$), celsian ($BaAl_2Si_2O_8$) or the like in the oxide phase can further improve the thermal shock resistance, oxidation resistance, and strength. It is to be noted that in this case, the compound containing the alkali earth metal for use is preferably monoxide, carbonate or the like of the alkali earth metal from the viewpoint of efficient formation of the oxide phase or ease of obtaining or handling.

It is to be noted that the calcining is preferably performed at a temperature lower than that to melt metal silicon. Specifically, the material may be once held at a predetermined temperature of about 150 to 700° C., or a temperature rise speed in a predetermined temperature range may be slowed at 50° C./hr or less during the calcining. In a technology to once retain the material at the predetermined temperature, the material may be retained at only one temperature standard or a plurality of temperature standards depending on the type and the amount of the used organic binder. Furthermore, when the material is retained at a plurality of temperature standards, the retaining time may be set to be equal or different. Similarly in a technology to delay the temperature rise speed, the rate may be slowed in an only certain temperature range or a plurality of segments. Furthermore, in the plurality of segments, the speeds may be set to be equal to or different from one another.

To form the resultant ceramic porous body into a porous structure in which included fire-resistant particles (particulate silicon carbide) are bonded via metal silicon, metal silicon needs to be softened during the firing. Since a melting point of metal silicon is 1410° C., the firing temperature during the firing is preferably set to 1410° C. or more. Furthermore, an optimum firing temperature is determined from a nucleus structure or a characteristic value. However, evaporation of metal silicon proceeds at a temperature exceeding 1600° C., and the bonding via metal silicon becomes difficult in some case. Therefore, the firing temperature is appropriately 1410 to 1600° C., preferably 1420 to 1580° C.

It is to be noted that even when silicon carbide is used as the aggregate constituting the substrate of the ceramic porous body, and cordierite is used as the bonding material, the manufacturing method may be performed in conformity with one example of the method in a case where silicon carbide is used as the aggregate and metal silicon is used as the bonding material. Specifically, there are added, to silicon carbide as the aggregate, the pore former supposed to be effective in connecting the communication holes having the certain degrees of uniform pore widths in multiple directions without forming the pore part to be coarse like the ink bottle after fired even when agglomerated (e.g., the inorganic micro-balloons which are not eliminated even when fired and/or hollow balloons (SD granules) obtained by treating silicon carbide particulates with a spraying drier or the like); the cordierite forming material containing the balloons (compound containing magnesium (Mg), aluminum (Al), and silicon (Si)); an organic binder and water if necessary. They are mixed and kneaded to obtain a plastic clay. When the inorganic micro-balloons are used, the inorganic micro-balloons are used as a part of an aluminum (Al) source and/or a silicon (Si) source, but other materials may be added as the aluminum (Al) source and/or the silicon (Si) source. Examples of the aluminum (Al) source other than the inorganic micro-balloons include a source containing either or both of aluminum oxide ($Al_2O_3$) and aluminum hydroxide ($Al(OH)_3$) because few impurities are contained. It is to be noted that when the porosity is further to be improved, the organic pore former may be combined.

It is preferable to use magnesium hydroxide ($Mg(OH)_2$) and/or magnesium carbonate ($MgCO_3$) as a part or all of the Mg source contained in the cordierite forming material. Magnesium hydroxide ($Mg(OH)_2$) and/or magnesium carbonate ($MgCO_3$) exhibits an effect that an amount of components remaining in cordierite formed by the firing is small and the resultant ceramic porous body can achieve higher porosity. It is to be noted that talc or the like may be combined as the magnesium (Mg) source to such an extent the above-described effect attributable to the use of magnesium hydroxide ($Mg(OH)_2$) and/or magnesium carbonate ($MgCO_3$) is not substantially influenced.

The resultant plastic clay is formed into a desired shape such as the honeycomb shape by an appropriate forming method. This forming may be performed by an extrusion molding method, an injection molding method, a press molding method, a method of forming a ceramic material into a columnar shape and forming through holes or the like. Above all, the extrusion molding method is preferable because continuous molding is easily performed, and cordierite crystals can be oriented to achieve a low thermal expansion property.

Subsequently, after the resultant article is calcined to remove (degrease) the organic binder contained in the article, the firing is performed. The calcining is preferably carried out at a temperature lower than that at which cordierite melts. Specifically, the article may be retained once at a predetermined temperature of about 300 to 600° C., or calcined while the temperature rise speed is slowed to 50° C./h or less in a predetermined temperature range.

A calcining atmosphere may be an oxidizing atmosphere. However, in a case where a large amount of organic binder is contained in the article, the binder is rapidly burnt by means of oxygen to rapidly raise an article temperature during the calcining in some case. When the calcining is performed in an inactive atmosphere such as nitrogen or argon, abnormal temperature rise of the article is preferably suppressed. This abnormal temperature rise is especially preferably suppressed in a case where a raw material having a large thermal expansion coefficient (vulnerable to thermal shock) is used. It is to be noted that for example, when an added ratio of the organic binder is not less than 20 vol % with respect to a main material, the calcining is preferably performed in the above-described inactive atmosphere.

To obtain a tissue in which silicon carbide is bonded via cordierite, cordierite needs to be softened. Since a softening point of cordierite is about 1400° C., firing temperature during the firing is preferably set to 1400° C. or more. Furthermore, an optimum firing temperature is determined by a fine structure or a characteristic value. However, a temperature exceeding 1500° C. largely exceeds a melting point of cordierite, firing contraction becomes large, and it becomes difficult to obtain a desired fine structure. Therefore, the firing temperature is preferably 1400 to 1500° C.

EXAMPLES

The present invention will be described hereinafter in more detail in accordance with examples, but the present invention is not limited to these examples.

Example 1

A silicon carbide (SiC) material powder having an average particle diameter of 33 μm and a silicon (Si) powder having an average particle diameter of 5 μm were blended into a composition at a mass ratio of 80:20, and the amount in parts by mass of fly ash balloons shown in Table 1 were added to 100 parts by mass of this powder. Subsequently, a compound containing a sufficient amount of an alkali earth metal for melting the fly ash balloons, and 6 parts by mass of methyl cellulose as an organic binder, 2.5 parts by mass of surfactant, and 24 parts by mass of water were added, uniformly mixed, and kneaded to obtain a clay to be formed. The resultant clay was molded into a honeycomb shape having an outer diameter of 45 mm, a length of 120 mm, a partition wall thickness of 0.43 mm, and a cell density of 100 cells/square inch (16 cells/cm$^2$) with an extrusion molding machine. Subsequently, the clay was calcined and degreased at 500° C. for five hours, and fired in a non-oxidizing atmosphere at 1450° C. for two hours to prepare a ceramic porous body (Example 1) having a honeycomb structure.

Example 2

A ceramic porous body (Example 2) having a honeycomb structure was prepared in the same manner as in Example 1 described above except that in addition to fly ash balloons, 20 parts by mass of an organic pore former (starch (average particle diameter of 50 μm)) were added.

Example 3

A silicon carbide (SiC) material powder having an average particle diameter of 33 μm and a cordierite forming material powder which did not include any fly ash balloon were blended into a composition at a mass ratio of 80:20, and parts by mass of fly ash balloons shown in Table 1 were added to 100 parts by mass of this powder. Subsequently, 20 parts by mass of an organic pore former (starch (average particle diameter of 50 μm)), further 6 parts by mass of methyl cellulose as an organic binder, 2.5 parts by mass of a surfactant, and 24 parts by mass of water were added, uniformly mixed, and kneaded to obtain a clay to be formed. The resultant clay was molded into a honeycomb shape having an outer diameter of 45 mm, a length of 120 mm, a partition wall thickness of 0.43 mm, and a cell density of 100 cells/square inch (16 cells/cm$^2$) with an extrusion molding machine. Subsequently, the clay was calcined and degreased at 500° C. for five hours, and fired in an oxidizing atmosphere at 1420° C. for two hours to prepare a ceramic porous body (Example 3) having a honeycomb structure.

Comparative Example 1

A ceramic porous body (Comparative Example 1) having a honeycomb structure was prepared in the same manner as in Example 1 described above except that a compound containing fly ash balloons and an alkali earth metal were not added.

Comparative Example 2

A ceramic porous body (Comparative Example 2) having a honeycomb structure was prepared in the same manner as in Example 2 described above except that a compound containing fly ash balloons and an alkali earth metal were not added, and the added amount of an organic pore former (starch (average particle diameter of 50 μm)) was set to 30 parts by mass.

Comparative Example 3

A ceramic porous body (Comparative Example 3) having a honeycomb structure was prepared in the same manner as in Example 2 described above except that a compound containing fly ash balloons and an alkali earth metal were not added, 15 parts by mass of a foamed resin (acrylonitrile-based plastic balloons (average particle diameter of 50 μm)) were added, and the added amount of an organic pore former (starch (average particle diameter of 50 μm)) was set to 15 parts by mass.

Comparative Example 4

A mullite ($3Al_2O_3 \cdot 2SiO_2$) material powder having an average particle diameter of 142 μm and a bonding material powder ($B_2O$, $SiO_2$) having an average particle diameter of 3 μm were blended into a composition at a mass ratio of 75:25. Subsequently, 6 parts by mass of methyl cellulose as an organic binder, 2.5 parts by mass of a surfactant, and 24 parts by mass of water were added, uniformly mixed, and kneaded to obtain clay to be formed. The resultant clay was molded into a honeycomb shape having an outer diameter of 45 mm, a length of 120 mm, a partition wall thickness of 0.43 mm, and a cell density of 100 cells/square inch (16 cells/cm$^2$) with an extrusion molding machine. Subsequently, the clay was calcined and degreased at 500° C. for five hours, and fired in an oxidizing atmosphere at 1000° C. for two hours to prepare a ceramic porous body (Comparative Example 4) having a honeycomb structure.

Comparative Example 5

A ceramic porous body (Comparative Example 5) having a honeycomb structure was prepared in the same manner as in Example 2 described above except that a compound containing fly ash balloons and an alkali earth metal was not added, 40 parts by mass of a foamed resin (acrylonitrile-based plastic balloons (average particle diameter of 50 μm)) were added, and the added amount of an organic pore former (starch (average particle diameter of 50 μm)) was set to 40 parts by mass.

particulates per unit time, and as the capturing efficiency, a value is calculated by subtracting a mass of particulates deposited on the filtering sheet at a time when the filter (ceramic porous body) is attached, in a case where the mass of the particulates deposited on the filtering sheet attains to 100 at a time when any filter (ceramic porous body) is not attached.

(Image Analysis)

Image analysis of each ceramic porous body is performed using an application for the image analysis (Image-pro Plus (trade name) (manufactured by MEDIA CYBERNETICS Cceramic porous body is cut, a cross-sectional plane is polio.)). Specifically, first an arbitrary portion of each pre-

TABLE 1

| | Aggregate | | Bonding material | | Organic pore former added amount (parts by mass) | Other additive | |
|---|---|---|---|---|---|---|---|
| | Material | Added amount (parts by mass) | Material | Added amount (parts by mass) | | Material | Added amount (parts by mass) |
| Example 1 | Silicon carbide | 80 | Metal silicon | 20 | — | Fly ash balloons | 20 |
| Example 2 | Silicon carbide | 80 | Metal silicon | 20 | 20 | Fly ash balloons | 20 |
| Example 3 | Silicon carbide | 80 | Cordierite | 20 | 20 | Fly ash balloons | 20 |
| Comparative Example 1 | Silicon carbide | 80 | Metal silicon | 20 | — | — | — |
| Comparative Example 2 | Silicon carbide | 80 | Metal silicon | 20 | 30 | — | — |
| Comparative Example 3 | Silicon carbide | 80 | Metal silicon | 20 | 15 | Foamed resin | 15 |
| Comparative Example 4 | Mullite | 75 | $B_2O$, $SiO_2$ | 25 | — | — | — |
| Comparative Example 5 | Silicon carbide | 80 | Metal silicon | 20 | 40 | Foamed resin | 40 |

(Physical Value Evaluation)

As to the respective prepared ceramic porous bodies, the following physical values were measured. Results are shown in Table 2.

[Porosity]: is measured by Archimedes method.

[Average pore size]: is measured with a mercury porosimeter.

[Four-point bending strength]: is measured on room-temperature conditions in conformity with a method described in JIS R1601.

[Permeability]: is measured with Perm Porometer (manufactured by PMI Co.).

Figure 2:
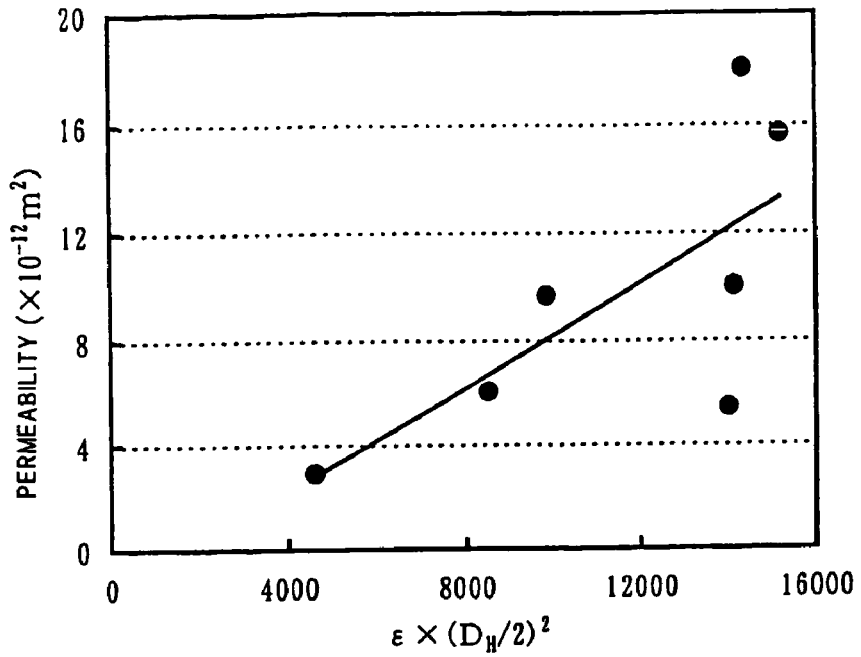
FIG. 2 is a graph in which the permeability is plotted with respect to a value of "$\epsilon \times (D_H/2)^2$."
Figure 3:
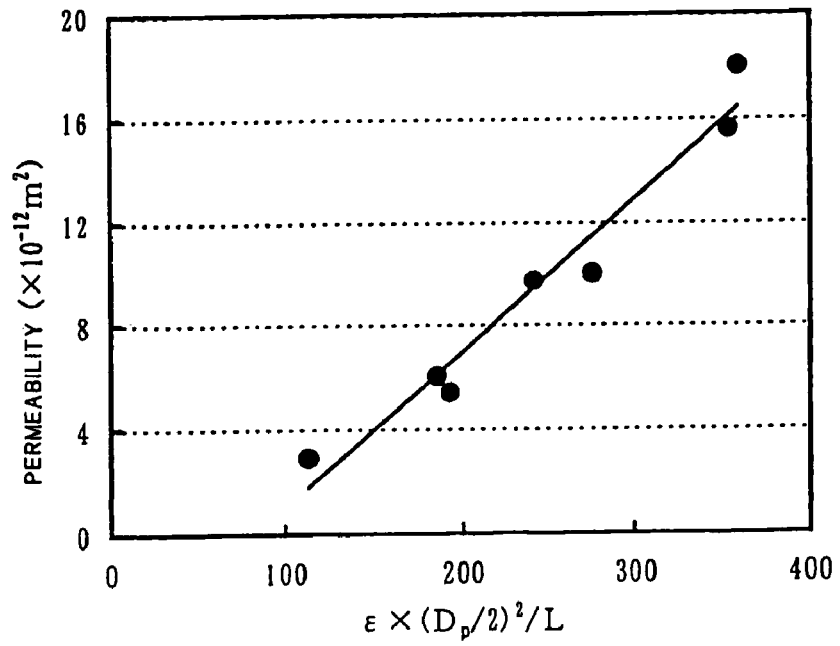
FIG. 3 is a graph in which the permeability is plotted with respect to a value of "$\epsilon \times (D_P/2)^2$."

[Capturing efficiency]: A filtering sheet is disposed on an outlet side of an engine which generated a certain amount of pared shed, a plane image is taken into a PC, and binarized, and a pore part 1 which is a white portion and a non-pore part 2 which is a black portion are extracted as shown in FIG. 1(a). Subsequently, a center line 3 passing a central part of the pore part 1 is drawn on this image as shown in FIG. 1(b), and a pore part mean width ($D_P$ (μm)) and a pore part mean length (L (μm)) are measured and calculated. Obtained results are shown in Table 2. FIG. 2 shows a graph in which permeability is plotted with respect to a value of "$\epsilon \times (D_H/2)^2$", and FIG. 3 shows a graph in which the permeability is plotted with respect to a value of "$\epsilon \times (D_P/2)^2$". It is to be noted that slant lines in FIGS. 2 and 3 are linear approximated curves drawn based on the plotted points.

TABLE 2

| | Porosity ε (%) | Mean pore size $D_H$ (μm) | Pore part mean width $D_P$ (μm) | Pore part mean length L (μm) | ε × $(D_H/2)^2$ | ε × $(D_P/2)^2$/L | Permeability ($\times 10^{-12}$ m$^2$) | Capturing efficiency (%) | 4-point bending strength (MPa) |
|---|---|---|---|---|---|---|---|---|---|
| Example 1 | 54 | 27 | 12.5 | 8.7 | 9842 | 242 | 9.68 | 95 | 25 |
| Example 2 | 63.9 | 30 | 14.7 | 9.58 | 14378 | 360 | 18 | 89 | 15 |
| Example 3 | 62 | 31.3 | 15 | 9.84 | 15185 | 354 | 15.6 | 90 | 20 |
| Comparative Example 1 | 46 | 20 | 11 | 12.3 | 4600 | 113 | 2.9 | 94 | 22 |
| Comparative Example 2 | 59 | 24 | 14.6 | 17 | 8496 | 185 | 6.03 | 88 | 11 |

TABLE 2-continued

| | Porosity ϵ (%) | Mean pore size $D_H$ (μm) | Pore part mean width $D_P$ (μm) | Pore part mean length L (μm) | $\epsilon \times (D_H/2)^2$ | $\epsilon \times (D_P/2)^2/L$ | Permeability ($\times 10^{-12}$ m$^2$) | Capturing efficiency (%) | 4-point bending strength (MPa) |
|---|---|---|---|---|---|---|---|---|---|
| Comparative Example 3 | 59 | 31 | 18 | 17.4 | 14175 | 275 | 10 | 72 | 10 |
| Comparative Example 4 | 29 | 44 | 32.5 | 39.7 | 14036 | 193 | 5.39 | 64 | 25 |
| Comparative Example 5 | 82 | — | — | — | — | — | — | — | 1.1 |

As shown in Table 2, it is apparent that the ceramic porous bodies of Examples 1 to 3 exhibit sufficient strength and capturing efficiency while having high permeability as compared with the ceramic porous bodies of Comparative Examples 1 to 5. It is also apparent that the ceramic porous body of Comparative Example 4 has a low permeability although the value of the mean pore size ($D_H$ (μm)) is large. This is supposedly because the value of the pore part mean length (L (μm)) is larger than that of another ceramic porous body; that is, the pores are branched less, and the introduced fluid has to meander through one independent long pore part. On the other hand, the values of the pore part mean lengths (L (μm)) of the ceramic porous bodies of Examples 1 to 3 are smaller than those of the ceramic porous bodies of Comparative Examples 1 to 4; that is, the pores are branched more finely, and the introduced fluid can permeate a plurality of pore parts with a larger degree of freedom. It is supposed that the bodies have high permeability so that a channel having the lowest pressure loss can be selected.

Moreover, as apparent from a comparison between FIGS. 2 and 3, as to the permeability of the ceramic porous body, it is apparent that "$\epsilon \times (D_P/2)^2/L$" (FIG. 3) exhibit a closer proportionality relation as compared with "$\epsilon \times (D_H/2)^2$", (FIG. 2). Therefore, according to the evaluation method of the present invention in which superiority/inferiority of the permeability of the ceramic porous body is judged using the value of "$\epsilon \times (D_P/2)^2/L$" as an index, the permeability of the ceramic porous body as the object can be simply and easily judged and evaluated with a satisfactory precision which has not been achieved by the conventional evaluation method. Furthermore, in addition to the evaluation of the superiority/inferiority of the permeability, the parameters as the factors for the superiority/inferiority of the permeability can be evaluated from not only the porosity and the pore size but also the pore shape. Therefore, it can be judged and evaluated that the ceramic porous body satisfying $L \leq D_H/2$ is a porous body having more superior pore shape as the member constituting the DPF. That is, the ceramic porous body prepared so as to satisfy the predetermined conditions by use of the evaluation method of the present invention retains the sufficient strength while having the high porosity and exhibits the high capturing efficiency and the high permeability.

INDUSTRIAL APPLICABILITY

As described above, in a ceramic porous body of the present invention, a plane image of a predetermined cross section is binarized by image analysis to distinguish a pore part from a non-pore part. In a case where a center line passing a central part of the pore part is drawn, a porosity (ϵ (%)), a pore part mean width ($D_P$ (μm)), and a pore part mean length (L (μm)) satisfy a predetermined relation. Therefore, the ceramic porous body has superior permeability and pore shape as a member constituting a filter such as a DPF. The ceramic porous body is provided with characteristics that it retains a sufficient strength while having a high porosity and exhibits a high capturing efficiency and a high permeability.

On the other hand, according to a method for evaluating the permeability of the ceramic porous body of the present invention, the plane image of the predetermined cross section is binarized by the image analysis to distinguish the pore part from the non-pore part. In a case where the center line passing the central part of the pore part is drawn, when the porosity (ϵ (%)), the pore part mean width ($D_P$ (μm)), the pore part mean length (L (μm)), and a mean pore size ($D_H$ (μm)) satisfy a predetermined relationship, it is judged that the ceramic porous body has the superior permeability and pore shape as the member constituting the DPF. Therefore, it is possible to use the method as an index for manufacturing the ceramic porous body which retains the sufficient strength while having the high porosity and which exhibits the high capturing efficiency and the high permeability.

The invention claimed is:

1. A ceramic porous body including a plurality of pores formed in a substrate made of a ceramic at a specified porosity; the substrate having predetermined end faces; and the pores connecting through the end faces of the substrate to each other and having branches, wherein when a cross-sectional plane image of the substrate cut along a predetermined plane is binarized by image analysis to distinguish a specified pore part derived from the pores from a specified non-pore part derived from the substrate, and a center line passing a central part of the pore part is drawn on the distinguished image, the porosity (ϵ (%)), a mean width ($D_P$ (μm)) of the pore part represented by a mean value of a distance, between outlines specifying the pore part and facing each other, perpendicular to the center line, a mean length (L (μm)) of the pore part represented by a mean value of a length of the center line between adjacent branch points among a plurality of specified branch points derived from the center line and a length of the center line between an end of the center line and the branch point adjacent to the end of the center line, and a mean pore size ($D_H$ (μm)) satisfy relations of the following equations (1) and (2):

$$200 \leq \epsilon \times (D_P/2)^2/L \quad (1);$$

and $$L \leq D_H/2 \quad (2).$$

2. The ceramic porous body according to claim 1, wherein the permeability is $5 \times 10^{-12}$ m$^2$ or more.

3. The ceramic porous body according to claim 2, wherein the ceramic includes at least one type selected from the group consisting of alumina, mullite, cordierite, silicon nitride, and silicon carbide.

4. The ceramic porous body according to claim 2, wherein a four-point bending strength is 10 MPa or more.

5. The ceramic porous body according to claim 1, wherein the permeability is $1 \times 10^{-11}$ $m^2$ or more.

6. The ceramic porous body according to claim 5, wherein the ceramic includes at least one type selected from the group consisting of alumina, mullite, cordierite, silicon nitride, and silicon carbide.

7. The ceramic porous body according to claim 5, wherein a four-point bending strength is 10 MPa or more.

8. The ceramic porous body according to claim 1 wherein the ceramic includes at least one type selected from the group consisting of alumina, mullite, cordierite, silicon nitride, and silicon carbide.

9. The ceramic porous body according to claim 4, wherein a four-point bending strength is 10 MPa or more.

10. The ceramic porous body according to claim 1 wherein a four-point bending strength is 10 MPa or more.

11. An evaluation method capable of clarifying superiority/inferiority of a permeability of a ceramic porous body as a member constituting a diesel particulate filter, and a factor for the superiority/inferiority of the permeability, the ceramic porous body including a plurality of pores formed in a substrate made of a ceramic at a specified porosity; the substrate having predetermined end faces: the pores connecting through the end faces of the substrate to each other and having branches, wherein in a case where a cross-sectional plane image of the substrate obtained by cutting the ceramic porous body along a predetermined plane is binarized by image analysis to thereby distinguish a specified pore part derived from the pores from a specified non-pore part derived from the substrate, and a center line passing a central part of the pore part is drawn on the distinguished image, when the porosity ($\mu(\%)$), a mean width ($D_p$ (μm)) of the pore part represented by a mean value of a distance, between outlines specifying the pore part and facing each other, perpendicular to the center line, a mean length (L (μm)) of the pore part represented by a mean value of a length of the center line between adjacent branch points among a plurality of specified branch points derived from the center line and a length of the center line between an end of the center line and the branch point adjacent to the end of the center line, and a mean pore size ($D_H$ (μm)) satisfy relations of the following equations (1) and (2), it is judged that the ceramic porous body has a superior permeability and a superior pore shape as the member constituting the diesel particulate filter:

$$200 \leq \epsilon \times (D_p/2)^2/L \quad (1);$$

and $$L \leq D_H/2 \quad (2).$$

* * * * *

UNITED STATES PATENT AND TRADEMARK OFFICE
CERTIFICATE OF CORRECTION

PATENT NO. : 7,488,366 B2
APPLICATION NO. : 10/565645
DATED : February 10, 2009
INVENTOR(S) : Masahiro Furukawa et al.

It is certified that error appears in the above-identified patent and that said Letters Patent is hereby corrected as shown below:

Title Page
   *Item (56) References Cited, U.S. PATENT DOCUMENTS:*
please change "6,541,407 B2* 4/2003 Merkel et al." to --6,541,407 B2* 4/2003 Beall et al.--

*Item (57) Abstract:*
please change "inclusing" to --including--

Column 16
   *Line 49*: please change "($D_P$ ($\mu$m))" to --($D_p$ ($\mu$m))--

Column 18
   *Line 9*: please change "($\mu$(%))" to --($\epsilon$(%))--

Signed and Sealed this

Twenty-first Day of April, 2009

JOHN DOLL
*Acting Director of the United States Patent and Trademark Office*